(12) United States Patent
Jäckel et al.

(10) Patent No.: US 7,150,207 B2
(45) Date of Patent: Dec. 19, 2006

(54) FLYWHEEL

(75) Inventors: Johann Jäckel, Bühlertal (DE); Hartmut Mende, Bühl (DE); Andreas Junk, Wismar (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 280 days.

(21) Appl. No.: 10/742,273

(22) Filed: Dec. 19, 2003

(65) Prior Publication Data

US 2004/0187630 A1  Sep. 30, 2004

(30) Foreign Application Priority Data

Dec. 19, 2002  (DE) ................. 102 60 120
Mar. 6, 2003  (DE) ................. 103 10 045

(51) Int. Cl.
*F16C 15/00* (2006.01)

(52) U.S. Cl. .................................... 74/572.2
(58) Field of Classification Search ............... 74/572, 74/574; 474/94; 123/192.1
See application file for complete search history.

(56) References Cited

U.S. PATENT DOCUMENTS

| | | | |
|---|---|---|---|
| 5,095,771 A | 3/1992 | Kühne | 74/572 |
| 5,194,044 A | 3/1993 | Jäckel et al. | 464/24 |
| 5,382,193 A | 1/1995 | Friedmann et al. | 464/64 |
| 6,047,804 A * | 4/2000 | Feldhaus et al. | 192/70.17 |
| 6,454,654 B1 * | 9/2002 | Friedmann et al. | 464/68.3 |
| 6,719,112 B1 * | 4/2004 | Peinemann et al. | 192/70.17 |

* cited by examiner

*Primary Examiner*—Vicky A Johnson
(74) *Attorney, Agent, or Firm*—Simpson & Simpson, PLLC

(57) ABSTRACT

A flywheel, especially for a dual-mass flywheel, having a friction surface and a mounting surface that is able to mate with a flange. It is distinguished by at least one buffer for the buffering of the friction surface and the mounting surface.

6 Claims, 6 Drawing Sheets

FLYWHEEL

CROSS-REFERENCE TO RELATED APPLICATIONS

This patent claims priority of German patent applications 102 60 120.8 and 103 10 045.8, which applications are incorporated herein by reference.

BACKGROUND OF THE INVENTION

This invention relates generally to a flywheel, especially for a dual-mass flywheel, with a friction surface and a mounting surface that is able to mate with a flange and a dual-mass flywheel with a primary rotating mass and a secondary rotating mass that has a flange and a flywheel with a friction surface and a mounting surface that is mated to the flange.

Flywheels and dual-mass flywheels of the type addressed here are known. They are used for torsional vibration damping, especially in a drive train of a motor vehicle. Moreover, they are used to couple two units, especially an engine, preferably an internal combustion engine, to a drive unit, preferably a clutch and/or a transmission. The known flywheels have a friction surface, which is also called a running surface, that is used as a coupling surface and a mounting area that can be used for transmitting the torque to other parts, especially a flange, to transmit torque. It has been proven that, in the production of the coupling, material deformations can occur that alter the surface characteristics of the friction surface. The alterations of the friction surface in this context can be so persistent/severe that its properties as a clutch are no longer acceptable.

OBJECTS OF THE INVENTION

The object of the invention is therefore to provide a flywheel and/or a dual-mass flywheel that do not have this disadvantage.

BRIEF SUMMARY OF THE INVENTION

According to the invention, a flywheel is proposed that includes the features mentioned in claim 1. It is distinguished by at least one buffer between friction surface and mounting surface. The buffer ensures that the forces occurring when the connection is produced between the mounting surface of a flywheel and the flange do not affect the friction surface or affect it only to the smallest degree. In producing the connection between the flange and the mounting surface, any material deformations that may occur thus have no effect on, or affect only to a tolerable degree, the friction surface.

An exemplary embodiment is preferred that distinguishes itself in that the at least one buffer has a sleeve by which the mating between flange and the mounting surface can be produced. In the joining of flange and mounting surface a mounting means can be incorporated in the sleeve of the buffer.

Moreover, an exemplary embodiment is preferred that is distinguished in that the sleeve is assigned to at least one web. The web is preferably formed as one piece together with the sleeve and is used for the mechanical buffer and the force transmission or the transmission of a torque.

Moreover, an exemplary embodiment is preferred that distinguishes itself in that the at least one web is matched with the flywheel. The web is also preferably formed of one piece with the flywheel. The sleeve, by which the mating of the flywheel with the flange is produced, is thus coupled via the web to the flywheel so that forces or torque may be transmitted from the flange to the flywheel. The web absorbs the forces occurring in this context, transfers them and is simultaneously used for mechanical buffering.

According to the invention, provision is also made that the sleeve is matched to the flange. Thus, forces, especially torque, are transmitted via the sleeve from the flange to the flywheel.

Another preferred exemplary embodiment is distinguished in that the sleeve is joined via a rivet to the flange. Joints using rivets require especially little structural space and can be easily produced.

Especially preferred is an exemplary embodiment that is distinguished in that the at least one buffer, at least in some areas, is elastically and/or plastically deformable, especially for producing the mating between the flange and the flywheel, especially a solid connection between the flange and the flywheel. In this way, the possibility is therefore intentionally provided of absorbing the forces that occur in the joining of the flange and flywheel through an intentional material deformation. Undesired deformations in areas, especially in the area of the friction surface, which must have an especially good manufacturing tolerance, can in this way be safely avoided.

Especially preferred is an exemplary embodiment that is distinguished in that the at least one web is matched via a rib to the flywheel. Forces that occur, especially torque, can be transferred via a rib from the web to the flywheel. Preferably, the web, the rib and the flywheel are formed together as one piece to connect the web to the flywheel.

In another exemplary embodiment of the invention, provision is made that the rib radially expands conically toward the friction surface. The rib is thus formed to be sturdier in the direction of the friction surface. This prevents elastic and/or plastic deformations that may occur in the area of the web from being transferred to the friction surface.

Moreover, the object of the present invention is achieved by a dual-mass flywheel having the features described in claim 10. It is distinguished in that the mounting surface has at least one buffer. This makes it possible to permit elastic and/or plastic deformations when producing the connection between the flange and the flywheel without this negatively affecting the characteristics of the friction surface.

To achieve the objective of the invention, moreover, a dual-mass flywheel is proposed that is characterized by a flywheel as described by claims 1 to 9.

BRIEF DESCRIPTION OF THE DRAWINGS

Additional advantages, features and details of the invention emerge in the following description in which.

DETAILED DESCRIPTION OF THE PREFERRED EMBODIMENT

Figure 1:
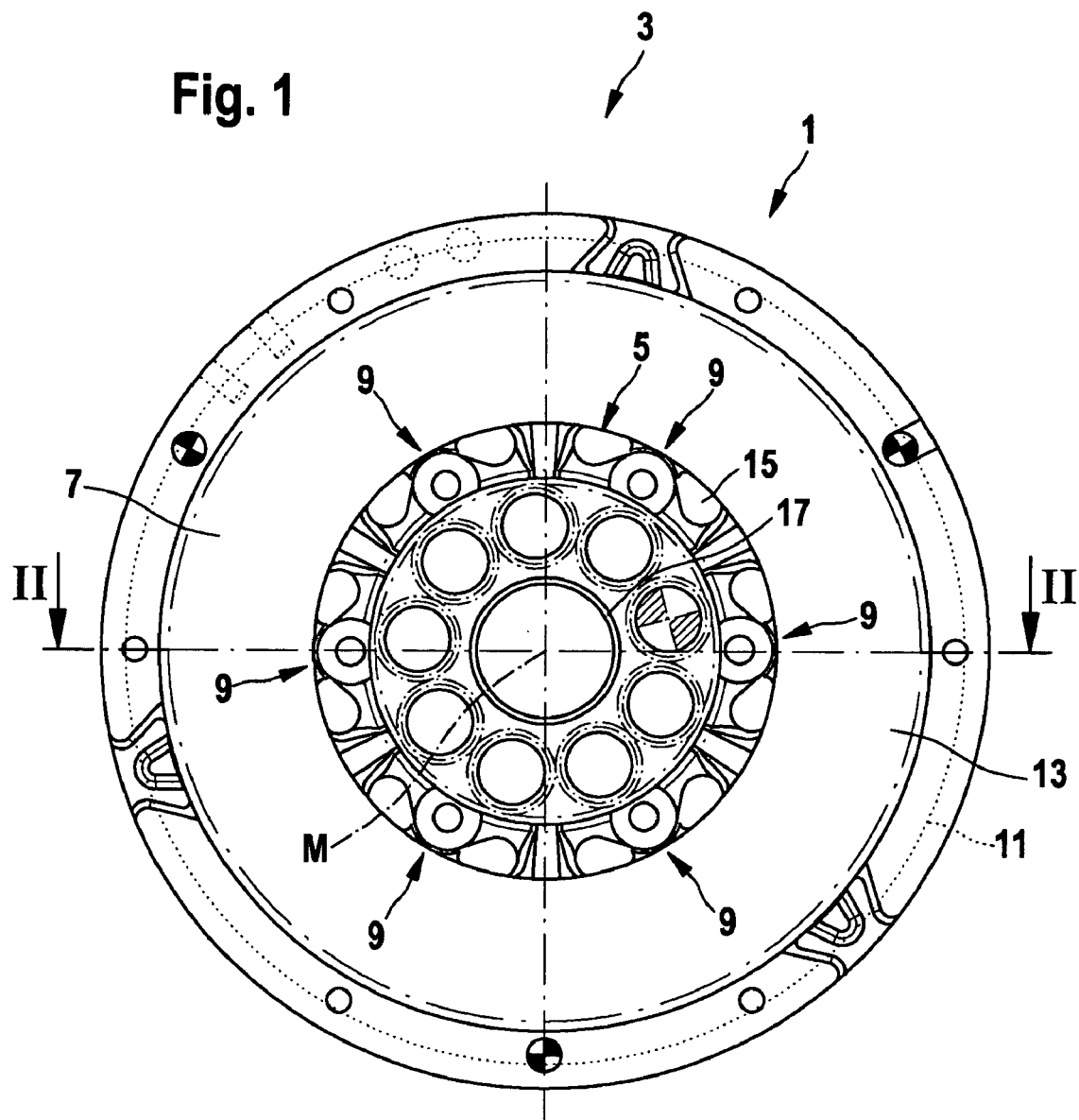
FIG. 1 is a plan view of the flywheel of the invention.

FIG. 1 shows a flywheel 1, which is in particular a part of a dual mass flywheel 3, having at least one mounting surface 5 and a friction surface 7.

Mounting surface 5 has at least one—in this case six—buffer(s) 9. The flywheel essentially has four annular function areas 11, 13, 15, 17. First function area 11 is used to link additional parts of a dry clutch (not shown here). Dry clutches are known, so this subject will not be dealt with further here. Second function area 13 is also a functional element of the dry clutch and includes friction surface 7 by which torque is transferable in a known way, especially via a frictional engagement. Third function area 15 has mounting surface 5 with buffers 9. Fourth function area 17 includes a friction bearing for the relative rotation of flywheel 1 along center axis M in relation to another rotating mass (not shown), which will be dealt with in detail in the description for FIGS. 4 and 5.

Figure 2:
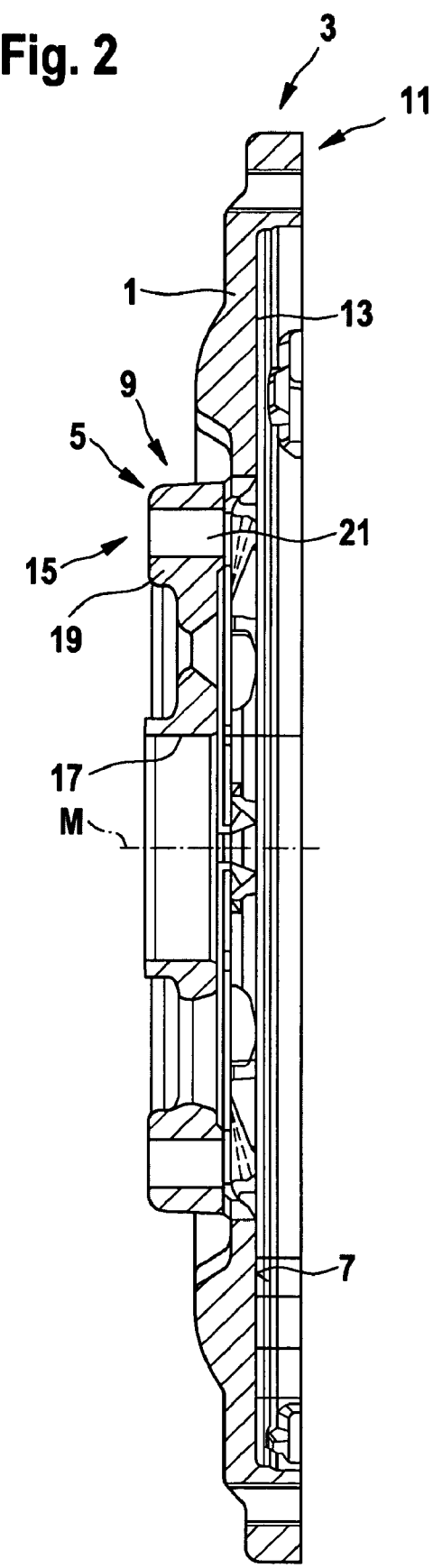
FIG. 2 illustrates a section taken generally along line II-II of the flywheel shown in FIG. 1.

FIG. 2 shows a sectional illustration along line II—II of flywheel 1, as depicted in FIG. 1. Equivalent parts are provided with the same reference characters, so that reference is made in this respect to the description of FIG. 1.

Since in this exemplary embodiment all six buffers 9 are configured in rotational symmetry with respect to a center axis M of flywheel 1 that is perpendicular to the focal plane, only one of the buffers is described below.

Recognizable here is buffer 9 with mounting surface 5, which are parts of the third function area 15 of flywheel 1. Buffer 9 has a sleeve 19 with a borehole 21. A rivet (not shown) may be inserted in bore 21 in order to mate flywheel 1 to another part, especially a flange (not shown) so that forces and/or torque are/is transferable. The rivet is inserted in particular into borehole 21 of sleeve 19 in such a manner that elastic and/or plastic material deformations of flywheel 1 that may occur do not have any effect on friction surface 7, which serves as a coupling surface and is subject to high manufacturing tolerances, especially regarding flatness. Manufacturing tolerances of the flange and/or the mounting surface 5 that may lead to the disruptive material deformations can thus be compensated by buffer 9.

The mode of operation of buffer 9 of flywheel 1 is described below in relation to FIGS. 3a to 3c, which show the different detail views of flywheel 1 as illustrated in FIGS. 1 and 2. Equal parts are provided with the same reference characters so that in this respect reference is made to the preceding Figures.

Figure 3A:
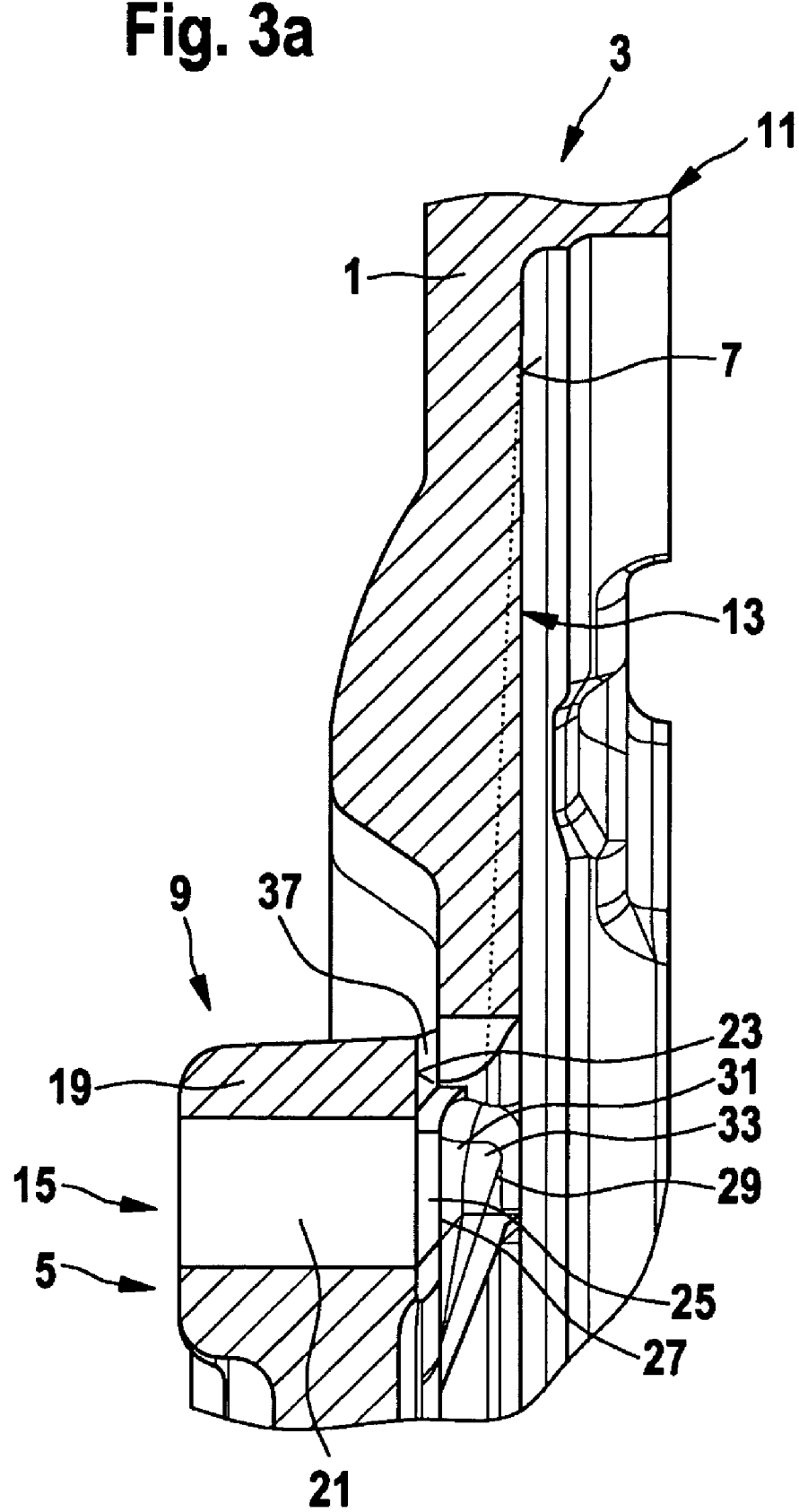
FIG. 3a is a detailed view of the section of the flywheel illustrated in FIG. 2.
Figure 3B:
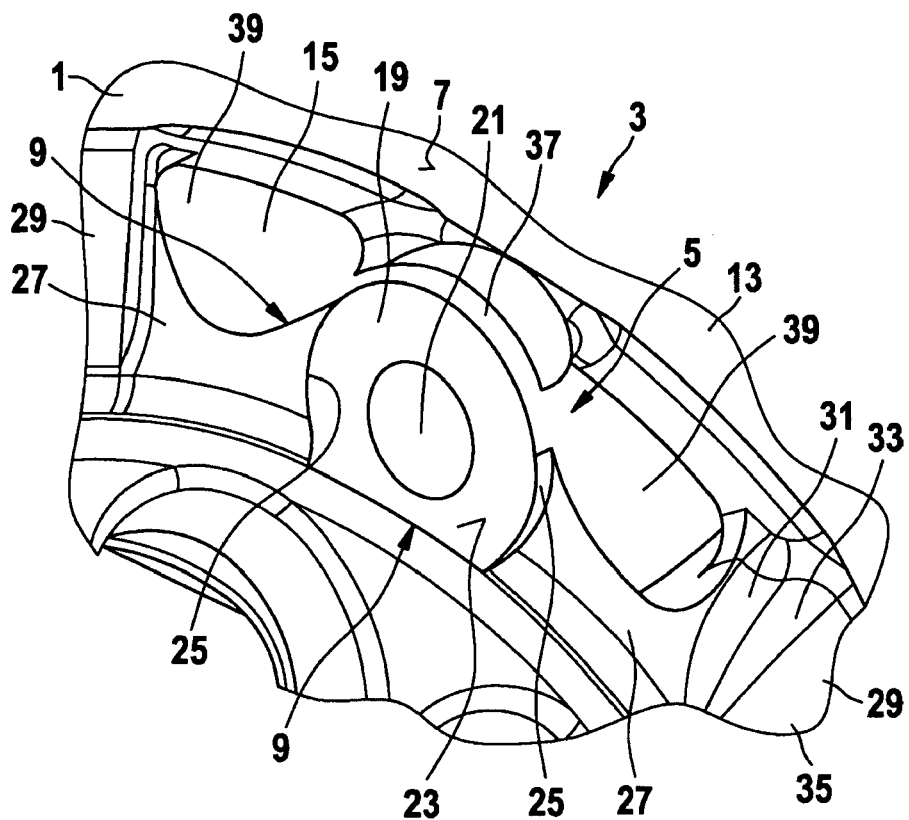
FIG. 3b is a perspective detail view of the plan view of the flywheel illustrated in FIG. 1.
Figure 3C:
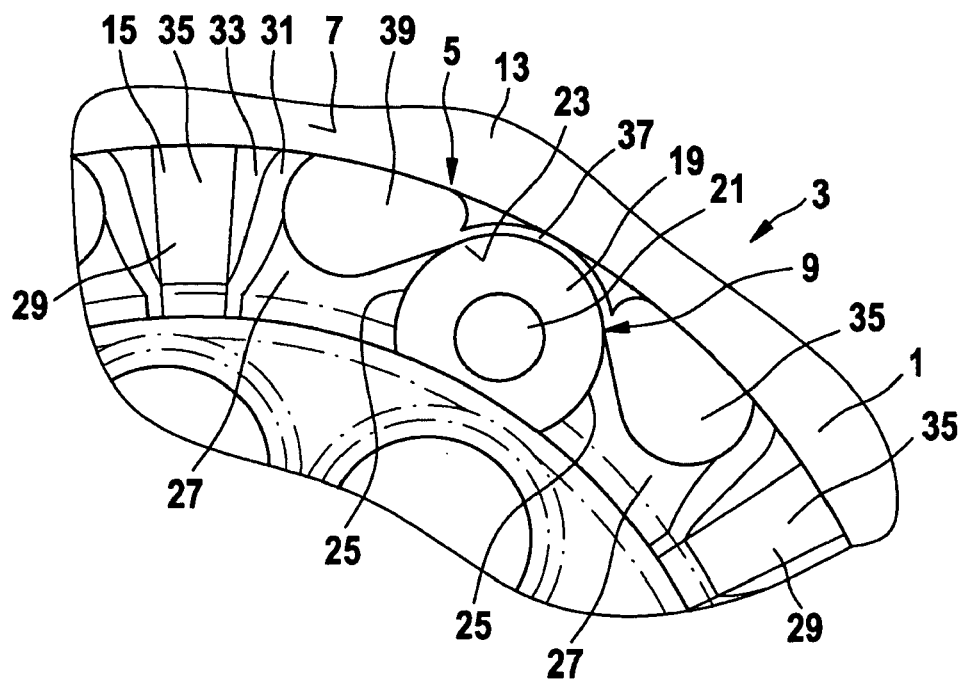
FIG. 3c is a detailed view of the plan view of the flywheel illustrated in FIG. 1.

Recognizable in FIGS. 3b and 3c is an end face 23 of sleeve 19 of buffer 9, which in FIG. 3a runs perpendicular to the focal plane. End face 23 can be produced, for example, by a milling operation and in each case continues in the circumferential direction up to a step 25 at which sleeve 19 of buffer 9 transitions into a web 27. Each of webs 27 in turn transitions into a rib 29 on their sides that face away from step 25.

The sectional illustration according to FIG. 3a permits recognition that the material thickness, moving away from sleeve 19, increases past step 25, web 27 and rising flanks 31, 33 of rib 29. Flanks 31 and 33 and a top side 35 of rib 29 are inclined in relation to the rotational plane and a theoretical diameter line of flywheel 1 in such a manner that rib 29 conically tapers in a radial direction toward central axis M of flywheel 1 and from the level relative to a theoretical rotational plane around the central axis 11, in which lies friction surface 7, drops down to the level of another theoretical rotational plane around the central axis 11, in which lies the visible side of web 27, which is visible in FIG. 3c.

It is recognizable that the area of sleeve 19 having bore hole 21 and end face 23, which can function as a contact surface for the rivet (not shown), in comparison to web 27 and to rib 29 has the smallest material thickness. Any deformations that may occur during the insertion of the rivet may thus lead to intentional deformations of it deliberately at the most weakly designed place without them being passed on through the clearly more robustly designed web 27 and the even more robustly designed rib 29 on second function area 13, which has friction surface 7.

The fact that sleeve 19 and second function area 13 having friction surface 7 are to the greatest extent mechanically decoupled is also indicated in that, although they are mounted directly adjacent to each other at the border area between the second and third function area 13, 15, they are separated from each other by a gap 37, which in each case transitions in the circumferential direction into two openings 39. Thus, it is practically excluded that additive elastic and/or plastic deformations of mounting surface 5, especially of sleeve 19, are passed on through webs 27 and ribs 29 up to friction surface 7 and there become disruptively apparent.

This makes it possible in a simple manner to join flywheel 1 to other parts, especially a flange (not shown). Additional process steps, especially a finish machining of friction surface 7 to restore its surface quality, are not necessary for this. Preferably, friction surface 7 is a rough-cast surface.

Figure 4:
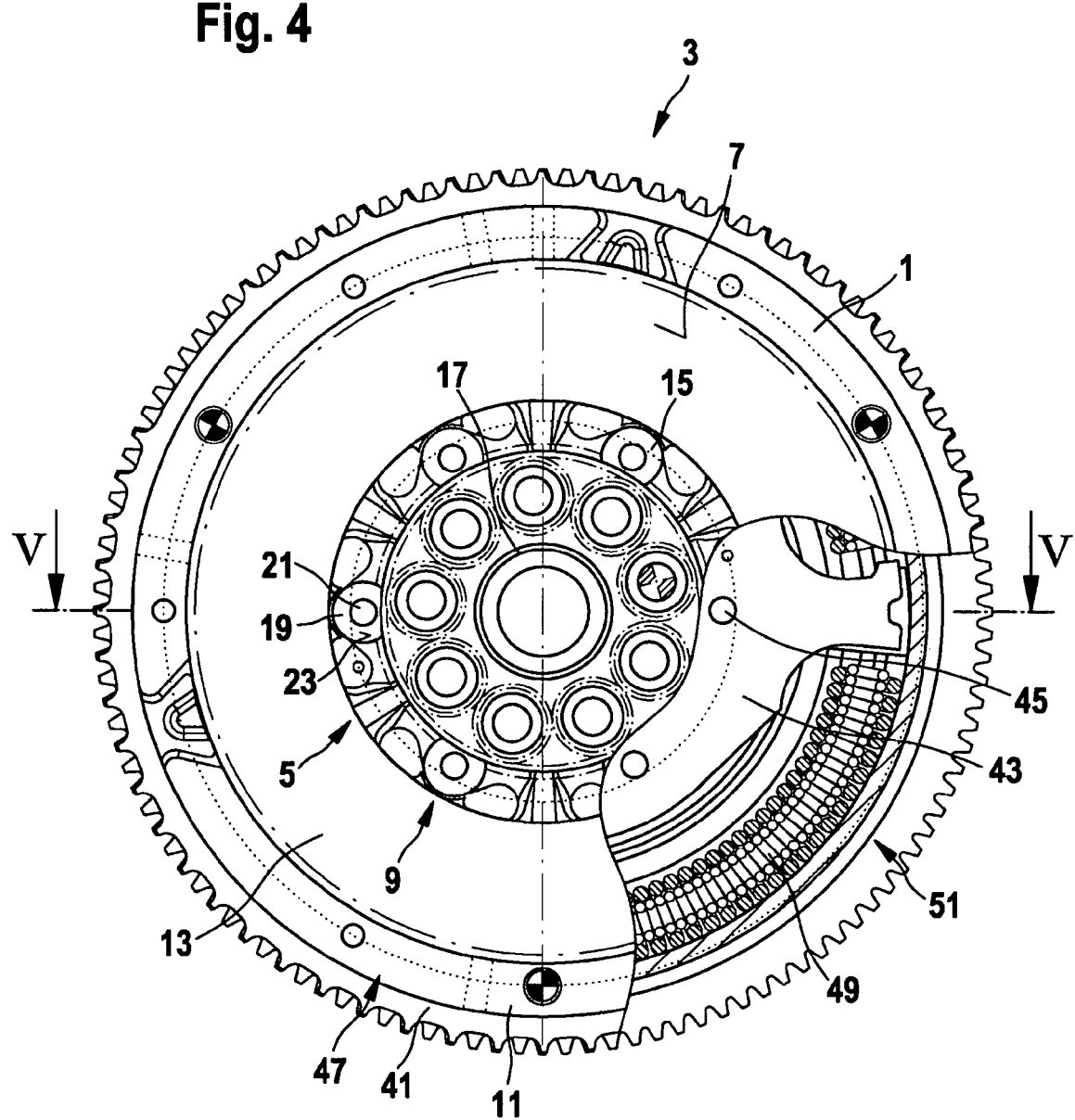
FIG. 4 is a plan view of a partial breakout of a dual-mass flywheel.
Figure 5:
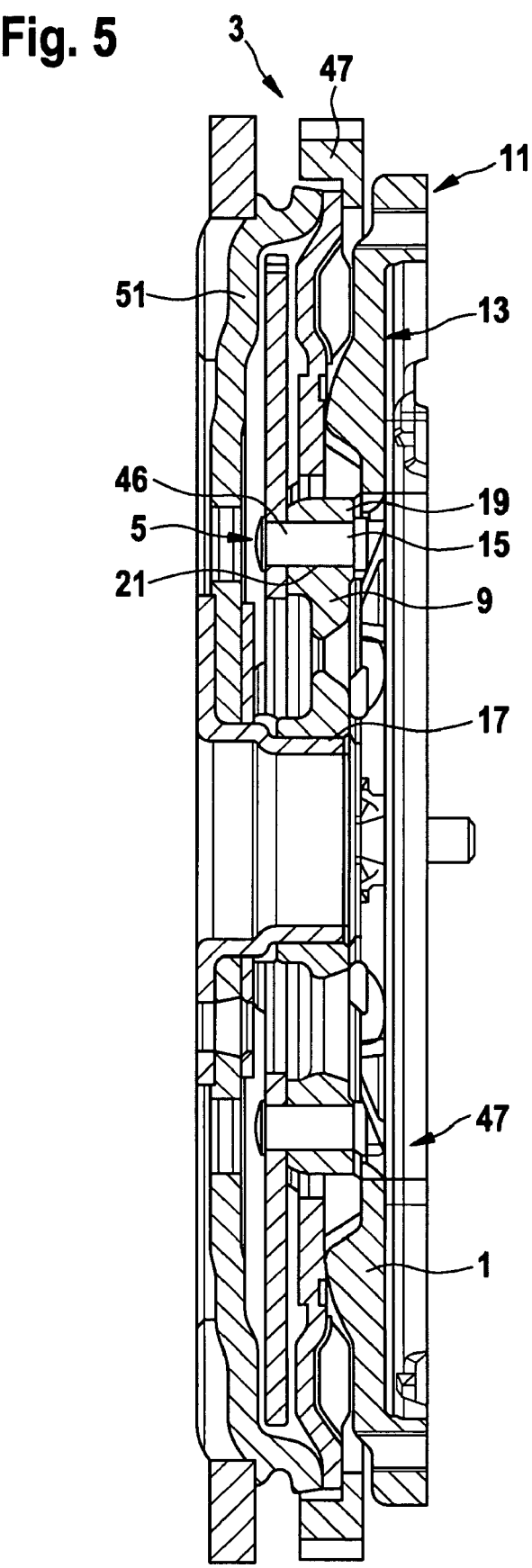
FIG. 5 is a sectional view of the dual-mass flywheel taken generally along line V—V of FIG. 4.

FIG. 4 shows a partial breakout of a dual-mass flywheel 3 with a flywheel 1, also called a secondary flywheel. FIG. 5 shows a section of dual-mass flywheel 3 as illustrated in FIG. 4 along line V—V. Equivalent parts are provided with the same reference characters so that in this respect reference is made to the description of the preceding Figures.

FIG. 4 shows dual-mass flywheel 3 in plan view on flywheel 1, as is illustrated in FIG. 1. Flywheel 1 is coupled to a sensor toothed ring 41, which adjoins first function area 11, and is coupled to a flange 43. Flange 43 and flywheel 1 can be coupled to each other via borehole 21 of sleeve 19 of mounting surface 5 of third function area 15 of flywheel 1 and boreholes 45 of flange 43, especially with the aid of at least one rivet 46, in such a manner that the forces and/or torque can be transmitted. Flange 43 and flywheel 1 are parts of a secondary rotating mass, which is coupled to a primary rotating mass 51 via at least one spring element 49 in such a manner that they can rotate in relation to each other. Primary rotating mass 51 may be assigned to an engine shaft, especially a crankshaft of an internal combustion engine. Secondary rotating mass 47 may in turn be coupled, as previously described already, via the one part of a friction surface 7 constituting a dry clutch to a drive shaft, especially of a transmission input shaft. Preferably, dual mass flywheel 3 is one such as is used for motor vehicles, especially for the damping of torque peaks and torsional vibrations that occur in drive train. The exact structure and mode of operation of dual-mass flywheels is known. Therefore, it will not be dealt with in further detail here.

Thus it is seen that the objects of the invention are efficiently obtained, although modifications to the invention should be readily apparent to those having ordinary skill in the art, and these changes and modifications are intended to be within the scope of the claims.

What is claimed is:

1. A dual-mass flywheel comprising:

a primary mass (51) and a secondary mass (47) that are rotatable with respect to each other, both masses (47, 51) being connected to one another via a spring element (49) to form a drive system, the spring element (49) being impingeable by a flange (43) connected to the secondary mass (47) in a rotationally fixed manner, and mounting regions (5) between the secondary flywheel mass (47) and the flange (43) being provided radially inside a friction surface (7) supported by the secondary flywheel mass (47), the secondary flywheel mass also having axial passages (37, 39) radially inside the friction surface (7), and buffers (9) of the secondary flywheel mass present radially inside the axial passages and regions (13) present radially outside the passages being connected to one another via radial ribs (29), and said mounting regions (5), viewed in the circumferential direction of the flywheel, each being provided between two radial ribs (29) and disposed in circumferential extending areas of the axial passages.

2. The dual-mass flywheel as defined in claim 1, wherein the passages (37, 39) are formed by two openings (39) connected to one another by a gap (37).

3. The dual-mass flywheel as defined in claim 2, wherein the mounting regions (5) are each situated radially inside a gap (37).

4. The dual-mass flywheel as defined in claim 1, wherein the buffers (9) radially present inside the passages (37, 39) form ridges (27) which run in the circumferential direction.

5. The dual-mass flywheel as defined in claim 4, wherein the ridges (27) merge into the radial ribs (29), which have a rib-like shape.

6. The dual-mass flywheel as defined in claim 4, wherein between every two ridges (27), which face one another in the circumferential direction, a sleeve (19) is present which has an axial opening (21) for producing a rivet connection (46).

* * * * *